United States Patent
Shaver et al.

(10) Patent No.: US 8,699,634 B2
(45) Date of Patent: Apr. 15, 2014

(54) WIRELESS COMMUNICATIONS DEVICE HAVING MAP TRELLIS DECODER WITH PARTIAL SUM TABLES AND RELATED METHODS

(75) Inventors: Joseph B. Shaver, Rochester, NY (US); John Wesley Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 433 days.

(21) Appl. No.: 13/173,034

(22) Filed: Jun. 30, 2011

(65) Prior Publication Data

US 2013/0003895 A1    Jan. 3, 2013

(51) Int. Cl.
*H04L 27/06*    (2006.01)

(52) U.S. Cl.
USPC .......................... 375/341; 714/796

(58) Field of Classification Search
USPC .................... 375/340, 341, 343; 714/796
See application file for complete search history.

(56) References Cited

U.S. PATENT DOCUMENTS

| | | | |
|---|---|---|---|
| 5,444,721 A * | 8/1995 | Okanoue et al. | 714/794 |
| 5,844,947 A | 12/1998 | Cesari | 375/341 |
| 6,377,312 B1 | 4/2002 | Limberg et al. | 348/614 |
| 6,556,632 B1 * | 4/2003 | Kubo et al. | 375/341 |
| 6,658,071 B1 | 12/2003 | Cheng | 375/348 |
| 7,092,457 B1 | 8/2006 | Chugg et al. | 375/324 |
| 7,096,412 B2 | 8/2006 | Chen et al. | 714/794 |
| 8,069,401 B2 * | 11/2011 | Pisek et al. | 714/795 |
| 2001/0034870 A1 | 10/2001 | Kravtchenko et al. | 714/769 |
| 2003/0118093 A1 | 6/2003 | Bohnhoff et al. | 375/229 |
| 2005/0135522 A1 * | 6/2005 | Becker | 375/350 |
| 2007/0140330 A1 | 6/2007 | Allpress et al. | 375/233 |
| 2010/0202507 A1 | 8/2010 | Allpress et al. | 375/233 |

OTHER PUBLICATIONS

Duel-Hallen et al., "Delayed Decision-Feedback Sequence Estimation," IEEE Transactions on Communications, vol. 37, No. 5, May 1989, pp. 428-436.

* cited by examiner

*Primary Examiner* — David B Lugo
(74) *Attorney, Agent, or Firm* — Allen, Dyer, Doppelt, Milbrath & Gilchrist, P.A.

(57) ABSTRACT

A wireless communications device includes a receiver, and a decoder coupled downstream from the receiver and using a modulation having memory for a received signal and to decode the received signal. The decoder decodes the received signal by at least determining a channel estimate for the received signal, generating partial sum tables based upon the channel estimate and possible values of a transmitted signal, correlating actual values of the received signal to the possible values from the partial sum tables to generate branch metrics associated with the modulation, and demodulating the received signal based upon the branch metrics using an iterative process based upon exchanging extrinsic information with an outer forward error correction (FEC) code.

20 Claims, 2 Drawing Sheets

US 8,699,634 B2

WIRELESS COMMUNICATIONS DEVICE HAVING MAP TRELLIS DECODER WITH PARTIAL SUM TABLES AND RELATED METHODS

FIELD OF THE INVENTION

The present invention relates to the field of mobile wireless communications devices, and, more particularly, to mobile wireless communications devices using modulations having memory and related methods.

BACKGROUND OF THE INVENTION

Mobile communications devices have become an integral part of society over the last two decades. The typical mobile communications device includes an antenna, and a transceiver coupled to the antenna. The transceiver and the antenna cooperate to transmit and receive communications signals.

Before transmission, the typical mobile communications device modulates digital data onto an analog signal. As will be readily appreciated by the skilled person, there is a plurality of modulations available for most applications. Some particularly advantageous modulations include, for example, continuous phase modulation (CPM). The constant envelope characteristics of this modulation provide for lower energy demands on the power amplifier of mobile communications devices, for example, by reducing the peak-to-average power ratio (PAPR), increasing average transmit power (providing greater transmission range), and increasing amplifier efficiency, i.e. allowing the use of non-linear amplifiers such as Class C amplifiers. Moreover, CPM provides for efficient use of available bandwidth.

A potential drawback of CPM modulations is the use of the inherent memory of the modulation when demodulating/decoding the waveform in order to obtain good demodulator performance. When the mobile communications device receives a transmitted signal that uses a modulation with memory, the decoder uses not only the current signal portion to demodulate but in addition uses information from previous signal portions, i.e. memory, to demodulate the current signal. In other words, the phase of the transmitted signal is dependent on previous signaling intervals.

Decoding modulations with memory increases the computational and memory demands on the transceiver, i.e. a maximum likelihood sequence estimator (MLSE), a hard decision device, or the Bahl-Cocke-Jelinek-Raviv (BCJR) algorithm (also known as the Maximum a posteriori probability (MAP) decoder), a soft decision device, are typically used to demodulate modulations with memory, thereby increasing the complexity of the device, which may be undesirable in a limited power compact mobile device. More so, when the received signal has a multipath component to it, the size of the MLSE or MAP trellis structure used to demodulate the signal grows exponentially, which may make practical implementation in a mobile communications device difficult since computational resources are limited.

When bandwidth efficient modulations, such as CPM, are concatenated with outer convolutional forward error correction (FEC) codes, the demodulation and multipath equalization processes may require a large amount of computational resources. In particular, the combined CPM/multipath MAP trellis structure may become very large and onerous in computational overhead. More so, the branch metric computations must be re-computed for every state, for every branch, and for every iteration in iterative applications.

In the typical mobile communications device where multipath is present, the MAP branch metrics for the combined CPM/MULTIPATH trellis structure is computed on-the-fly and based upon the following formula.

$$b_{t_{s,k}} = Ext_{t_{s,k}} + \sum_{l=0}^{L-1}\left(y_{t_l} - \sum_{i=0}^{N-1} h_{est_i} w_{t_{s,k,l}}\right)^2$$

Where $b_{t_{s,k}}$ is the branch metric at symbol time t for state s and data $Ext_{t_{s,k}}$ is the extrinsic information for symbol time t, state s, and data k, $y_{t_l}$ is the received sample l at time t, $h_{est_i}$ is tap i of the channel estimate, L is the number of samples per symbol, N is the total number of taps in the channel estimate (which is equal to L samples per symbol times M symbols of multipath), and $w_{t_{s,k,l}}$ are the CPM samples (past and current) for symbol time t, state s, sample l, using either the symbol memory of the current MAP trellis state or the survivor path memory of the current state and the data k. Of course, using this approach, the computational resources of the typical mobile communications device may be taxed since these operations may include a large number of complex multiplications.

One approach is disclosed in U.S. Patent Application Publication No. 2003/0118093 to Bohnhoff et al., which discloses a Viterbi equalizer (a hard decision device) for receiving a signal subject to interference. The equalizer performs operations on each channel state and calculates in advance metric increments relating to all the transitions from a state that can be predetermined in the time step k to the states that can be reached by the transitions in the time step k+1.

SUMMARY OF THE INVENTION

In view of the foregoing background, it is therefore an object of the present invention to provide a wireless communications device that can readily process memory based modulations.

The wireless communications device includes a receiver, and a decoder coupled downstream from the receiver and configured to use a modulation having memory for a received signal and to decode the received signal by at least determining a channel estimate for the received signal, generating a plurality of partial sum tables based upon the channel estimate and possible values of a transmitted signal, correlating actual values of the received signal to the possible values from the plurality of partial sum tables to generate branch metrics associated with the modulation, and demodulating the received signal based upon the branch metrics, for example, MAP branch metrics, using an iterative process based upon exchanging extrinsic information with an outer FEC code. Advantageously, the wireless communications device may demodulate the received signal using a MAP trellis decoder without intensive on-the-fly computations.

In some embodiments, the decoder may be configured to generate the plurality of partial sum tables based upon the channel estimate and all possible values of the transmitted signal. More specifically, the decoder may be configured to generate the branch metrics, for example, MAP branch metrics, for a trellis structure associated with the modulation, and to demodulate the received signal further based upon the associated trellis structure. Helpfully, the decoder may be configured to generate the branch metrics by at least summing a plurality of partial sum values from of the plurality of partial sum tables and using the extrinsic information from the outer FEC code, thereby avoiding complex multiplication operations.

In some embodiments, the decoder may be configured to generate the plurality of partial sum tables based upon a number of samples per data symbol in the received signal and a number of samples in the channel estimate. Also, the decoder may be configured to generate the plurality of partial sum tables by at least generating the possible values of the transmitted signal, and multiplying each sample of the channel estimate by the possible values of the transmitted signal.

Moreover, the decoder may be configured to generate the plurality of partial sum tables prior to receipt of the received signal. For example, the wireless communications device may further comprise an antenna coupled to the receiver. The decoder may be based upon a field-programmable gate array (FPGA) chip, and the received signal may comprise a continuous phase modulation (CPM) signal concatenated with the outer FEC code.

Another aspect is directed to a method of operating a wireless communications device. The method comprises using a decoder for a modulation having memory for a received signal and to decode the received signal. The decoding includes determining a channel estimate for the received signal, generating a plurality of partial sum tables based upon the channel estimate and possible values of a transmitted signal, correlating actual values of the received signal to the possible values from the plurality of partial sum tables to generate branch metrics associated with the modulation, and demodulating the received signal based upon the branch metrics using an iterative process based upon exchanging extrinsic information with an outer FEC code.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
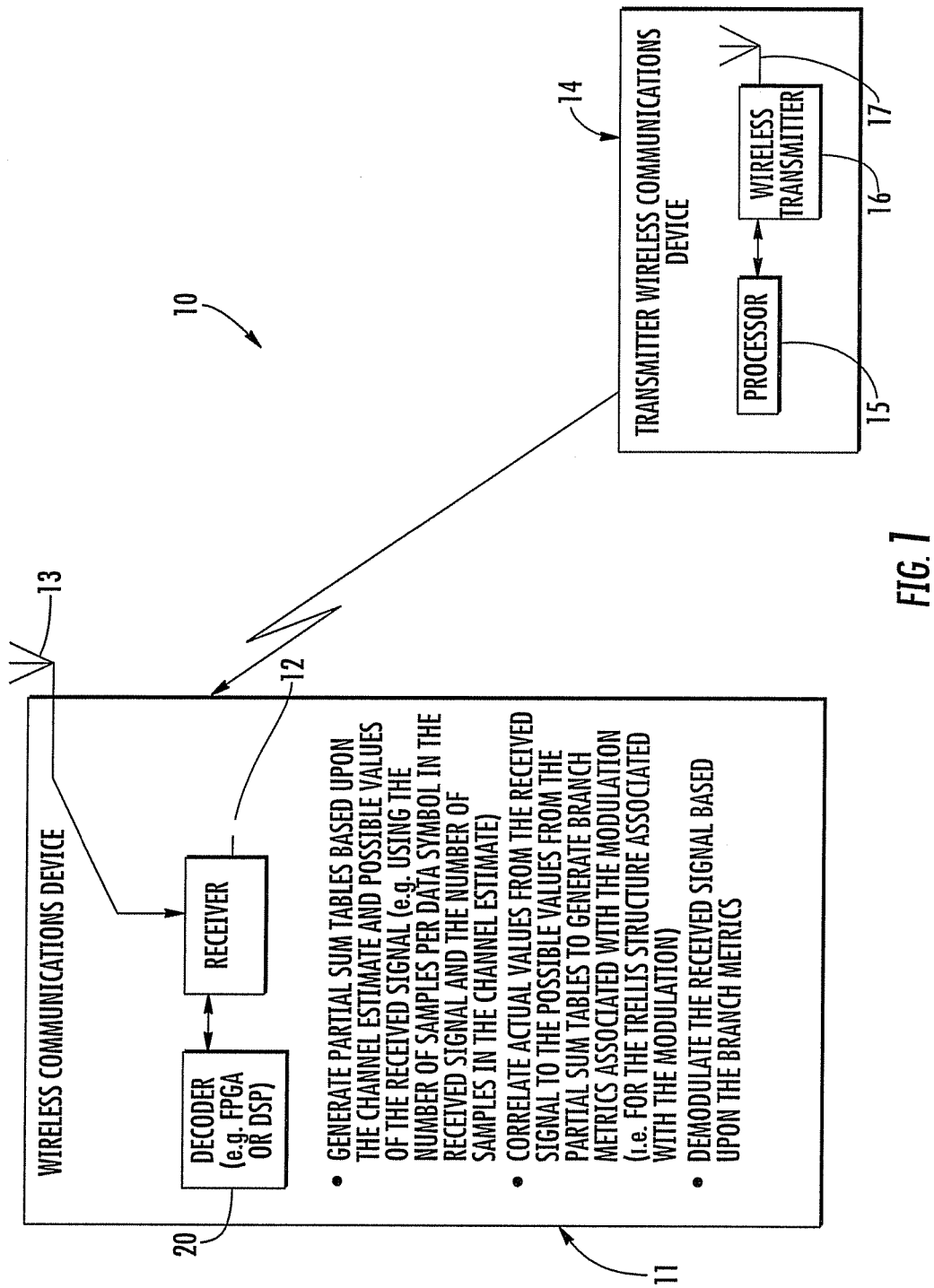
FIG. 1 is a schematic diagram of a wireless communication system, according to the present invention.
Figure 2:
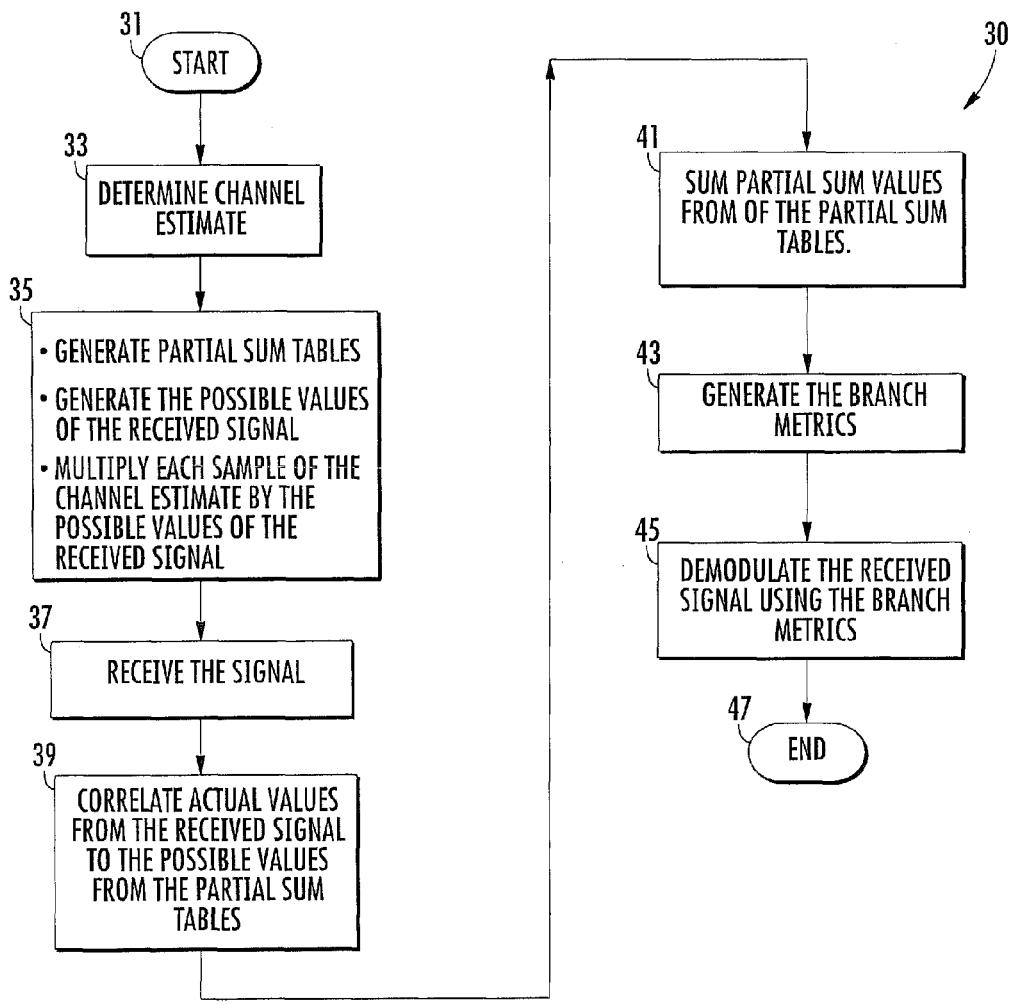
FIG. 2 is a flowchart illustrating operation of the receiver wireless communications device of FIG. 1.

Referring now to FIGS. 1-2, a wireless communication system 10 according to the present invention is now described. The wireless communications system 10 illustratively includes a receiver wireless communications device 11, and a transmitter wireless communications device 14 communicating therewith. Furthermore, a flowchart 30 illustrates a method of operation of the receiver wireless communications device 11, which begins at Block 31. The receiver wireless communications device 11 illustratively includes an antenna 13, a receiver 12 coupled to the antenna, and a decoder 20 coupled downstream from the receiver.

The transmitter wireless communications device 14 illustratively includes an antenna 17, a transmitter 16 coupled to the antenna, and a processor 15 coupled to the transmitter. As will be appreciated by those skilled in the art, the wireless communications devices 11, 14 may include a plurality of differing types of wireless communications devices modified according to the teachings herein, for example, the Falcon® III/117G manpack radio, or SBR/SPR handheld radio, as available from the Harris Corporation of Melbourne, Fla., the assignee of the present application. Moreover, as will be appreciated by those skilled in the art, although the wireless communications devices 11, 14 are depicted as one-way communications device for clarity of explanation, i.e. a transmitter and companion receiver (simplex communications), they may each comprise transceivers for typical duplex communications.

As illustrated, the transmitter wireless communications device 14 transmits a modulated signal to the receiver wireless communications device 11. In one advantageous embodiment, the wireless communication system 10 may use a bandwidth efficient modulation, for example, a CPM modulation concatenated with a convolutional FEC code. As will be appreciated by those skilled in the art, these modulations include memory, and the decoder 20 may implement a MAP trellis decoder to demodulate the received signal, i.e. to exploit the fact that the modulation has memory. The decoder 20 (CPM/multipath trellis decoder) may be based upon one of the following algorithms: the Bahl-Cocke-Jelinek-Raviv (BCJR or MAP) algorithm, the Max-Log-MAP algorithm, the Constant-Log-MAP algorithm, the Linear-Log-MAP algorithm, and the Log-MAP algorithm. Note that all algorithms listed after MAP algorithm are simplifications to the BCJR/MAP algorithm.

The decoder 20 and the receiver 12 may be based upon one or more of an FPGA chip, a digital signal processing integrated circuit (DSP IC) chip, etc. Nevertheless, as will be appreciated by those skilled in the art, in the typical communications device, there are finite computational resources to implement a MAP trellis decoder, thereby potentially making implementing MAP trellis decoders quite onerous. In particular, and as discussed above, the calculations typically performed to generate branch metrics for the MAP trellis decoder can be intensive.

The decoder 20 is configured to decode the received signal. In particular, the process begins with the decoder 20 determining a channel estimate for the received signal (Block 33). The channel estimate can be computed based on a portion of the transmitted waveform that is known at the receiver.

The decoder 20 is configured to generate a plurality of partial sum tables based upon the channel estimate and possible values of the transmitted signal (Block 35), i.e. possible values of the signal transmitted from the transmitter wireless communications device 14. In some embodiments, the decoder 20 is configured to generate the plurality of partial sum tables based upon the channel estimate and all possible values of the transmitted signal. Since the decoder 20 uses possible values of the transmitted signal, these values may be pre-computed prior to receipt of the actual signal. Of course, in these embodiments, more memory resources for the receiver wireless communications device 11 would be necessary since the plurality of partial sum tables would need to be computed for each possible channel estimate value and each potential transmitted signal value.

In particular, the decoder 20 is configured to generate the plurality of partial sum tables based upon a number of samples per data symbol in the received signal and a number of samples in the channel estimate. The decoder 20 is configured to generate the plurality of partial sum tables by at least generating the possible values of the transmitted signal, and multiplying each sample of the channel estimate by the possible values of the transmitted signal. The number of tables generated is equal to T*L*N, where T is the total number of possible transmitted signals, L is the samples per symbol, and N is the number of samples in the channel estimate. In other words, the partial sum tables are generated by computing all possible values of the transmitted signal multiplied by each sample of channel estimate and for L time shifts of the L samples per symbol.

As will be appreciated by those skilled in the art, in conjunction with the teachings herein, there may be L shifts for L samples per symbol. For example, for L=2 samples per symbol and 9 taps for the channel estimate and 192 possible trajectories for the CPM waveform (4-ary, h=⅙, 2RC), 2*9*192 (3,456) partial sum tables are computed once. Without the pre-computed table, i.e. in the typical communications device, 18*96*M (3,456*M) multiplies would be required for each M symbol block.

In some embodiments, the decoder 20 can be modified for when interpolated channel estimates are desired. While the decoder 20 uses a set of current partial sum tables for a current channel estimate, a parallel process can compute new partial sum tables for a next block in the received signal, which would be based upon an interpolated channel estimate. The decoder 20 can perform this update of the partial sum tables all at once or progressively, going sequentially through each item in table. In particular, the decoder 20 can further update the channel estimate and the partial sum tables in parallel using hard decisions from a current iteration (extrinsic information) while an outer decoder uses current extrinsic information for decoding the outer code. In the alternative, the decoder 20 can update partial sum tables using the latest extrinsic information from the outer code. Also, in some embodiments, the decoder 20 can generate varying sets of partial sum tables for different channel estimates.

Once the transmitted signal is received, (Block 37), the decoder 20 (inner) is configured to compute branch metrics based upon the extrinsic information provided by the outer decoder, the received samples, the plurality of partial sum tables (Blocks 39, 41, & 43), and the detected multipath. The decoder 20 uses the calculated branch metrics along with the MAP trellis structure associated with the modulation. The decoder 20 is configured to demodulate the received signal based upon the branch metrics and the MAP trellis structure (Blocks 45 & 47) in an iterative fashion exchanging extrinsic information with an outer FEC code.

Furthermore, while the decoder 20 is generating the branch metrics, in some embodiments, the wireless communications device may use delayed decision feedback sequence estimator (DDFSE) based techniques (aided by extrinsic information from the outer code) to reduce the number of states required for the MAP trellises, thereby further reducing the resources used by the decoder. Also, when processing the current state of the received signal, if the MAP decoder uses all possible states associated with the CPM waveform and the multipath, the decoder 20 may appropriate the full needed memory resources for multipath effects.

Advantageously, the branch metrics may be computed by the decoder 20 using only simple summation operations, which are less complex than the complex multiplication that may be used in the typical decoder. Indeed, in FPGA embodiments, a copy of the partial sum tables may be created for each state in the trellis structure, which allows for full parallelism for each state. Moreover, the decoder 20 may provide the branch metrics with increased speed, and in certain embodiments, the inner CPM/multipath MAP decoder may also experience an increase in speed. This is quite advantageous in an iterative demodulator where this step is repeated N times.

Other features relating to wireless communications devices are disclosed in co-pending applications "MOBILE WIRELESS COMMUNICATIONS DEVICE AND RECEIVER WITH DEMODULATION AND RELATED METHODS," application Ser. No. 12/884,846; and "WIRELESS COMMUNICATIONS DEVICE WITH TRELLIS DECODER AND RELATED METHODS," which are all incorporated herein by reference in their entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications device comprising:
a receiver; and
a decoder coupled downstream from said receiver and configured to use a modulation having memory for a received signal, said decoder configured to decode the received signal by:
  determining a channel estimate for the received signal;
  generating a plurality of partial sum tables based upon the channel estimate and possible values of a transmitted signal;
  correlating actual values of the received signal to the possible values from the plurality of partial sum tables to generate branch metrics associated with the modulation; and
  demodulating the received signal based upon the branch metrics using an iterative process based upon exchanging extrinsic information with an outer forward error correction (FEC) code.

2. The wireless communications device of claim 1 wherein said decoder is configured to generate the plurality of partial sum tables based upon the channel estimate and all possible values of the transmitted signal.

3. The wireless communications device of claim 1 wherein said decoder is configured to generate the branch metrics for a trellis structure associated with the modulation, and to demodulate the received signal further based upon the associated trellis structure.

4. The wireless communications device of claim 1 wherein said decoder is configured to generate the branch metrics by at least summing a plurality of partial sum values from the plurality of partial sum tables and using the extrinsic information from the outer FEC code.

5. The wireless communications device of claim 1 wherein said decoder is configured to generate the plurality of partial sum tables based upon a number of samples per data symbol in the received signal and a number of samples in the channel estimate.

6. The wireless communications device of claim 1 wherein said decoder is configured to generate the plurality of partial sum tables by generating the possible values of the transmitted signal, and multiplying each sample of the channel estimate by the possible values of the transmitted signal.

7. The wireless communications device of claim 1 wherein said decoder is configured to generate the plurality of partial sum tables prior to receipt of the received signal.

8. The wireless communications device of claim 1 wherein the received signal comprises a continuous phase modulation (CPM) signal concatenated with the outer FEC code.

9. A wireless communications device comprising:
a receiver;

an antenna coupled to said receiver; and a decoder coupled downstream from said receiver and configured to use a modulation having memory for a received signal, said decoder configured to decode the received signal by:

determining a channel estimate for the received signal, generating a plurality of partial sum tables based upon the channel estimate and possible values of a transmitted signal prior to receipt of the received signal, correlating actual values of the received signal to the possible values from the plurality of partial sum tables to generate branch metrics for a trellis structure associated with the modulation, and demodulating the received signal based upon the branch metrics and the trellis structure using an iterative process based upon exchanging extrinsic information with an outer forward error correction (FEC) code.

10. The wireless communications device of claim 9 wherein said decoder is configured to generate the branch metrics by at least summing a plurality of partial sum values from of the plurality of partial sum tables and using the extrinsic information from the outer FEC code.

11. The wireless communications device of claim 9 wherein said decoder is configured to generate the plurality of partial sum tables based upon a number of samples per data symbol in the received signal and a number of samples in the channel estimate.

12. The wireless communications device of claim 9 wherein said decoder is configured to generate the plurality of partial sum tables by at least generating the possible values of the transmitted signal, and multiplying each sample of the channel estimate by the possible values of the transmitted signal.

13. A method of operating a wireless communications device comprising:

using a decoder for a modulation having memory for a received signal to decode the received signal by:

determining a channel estimate for the received signal;

generating a plurality of partial sum tables based upon the channel estimate and possible values of the transmitted signal;

correlating actual values of the received signal to the possible values from the plurality of partial sum tables to generate branch metrics associated with the modulation; and demodulating the received signal based upon the branch metrics using an iterative process based upon exchanging extrinsic information with an outer forward error correction (FEC) code.

14. The method of claim 13 further comprising generating the plurality of partial sum tables based upon the channel estimate and all possible values of the transmitted signal.

15. The method of claim 13 further comprising generating the branch metrics for a trellis structure associated with the modulation, and demodulating the received signal further based upon the associated trellis structure.

16. The method of claim 13 further comprising generating the branch metrics by at least summing a plurality of partial sum values from of the plurality of partial sum tables and using the extrinsic information from the outer FEC code.

17. The method of claim 13 further comprising generating the plurality of partial sum tables based upon a number of samples per data symbol in the received signal and a number of samples in the channel estimate.

18. The method of claim 13 wherein the generating of the plurality of partial sum tables comprises generating the possible values of the received signal, and multiplying each sample of the channel estimate by the possible values of the transmitted signal.

19. The method of claim 13 wherein the generating of the plurality of partial sum tables is prior to receipt of the received signal.

20. The method of claim 13 wherein the received signal comprises a continuous phase modulation (CPM) signal concatenated with the outer FEC code.

* * * * *